G. Fletcher, Sr.
Polishing Stone.
N° 6,383. Patented Apr. 24, 1849.
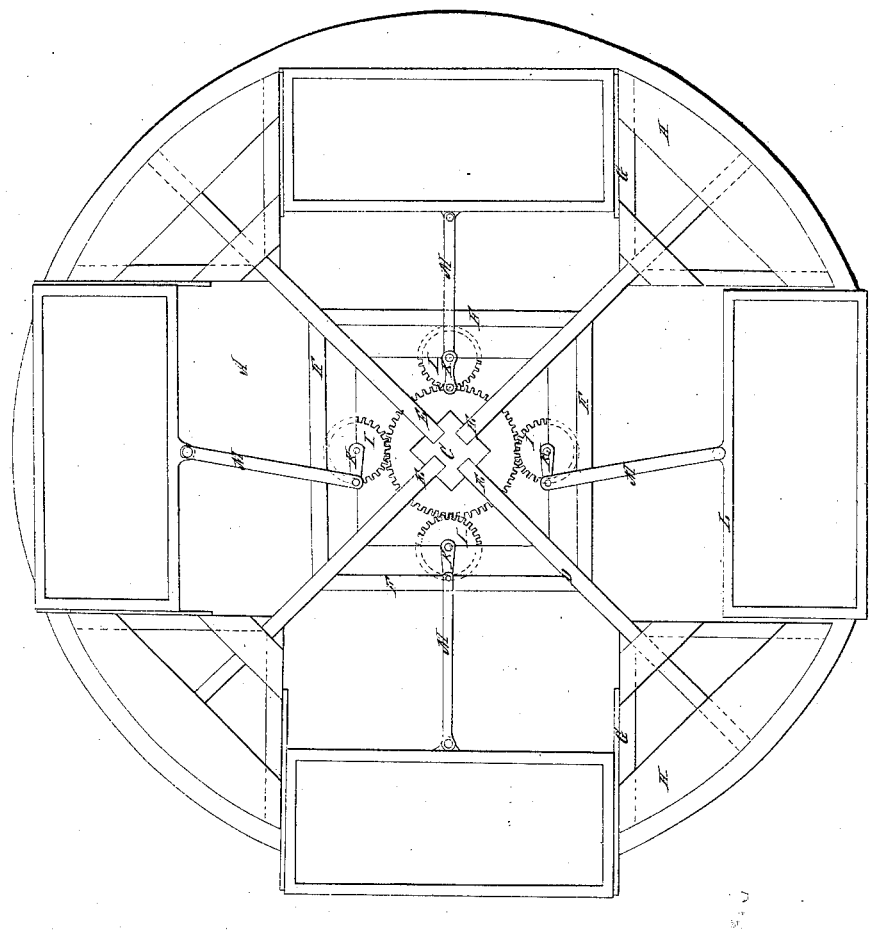

UNITED STATES PATENT OFFICE.

GEORGE FLETCHER, SR., OF GREENSBURG, INDIANA.

MACHINE FOR POLISHING STONE.

Specification of Letters Patent No. 6,383, dated April 24, 1849.

*To all whom it may concern:*

Be it known that I, GEORGE FLETCHER, Sr., of Greensburg, Indiana, have invented new and useful Improvements in Machinery for Shifting, Rubbing, and Polishing Dressed Stone; and I do hereby declare the following to be a full, clear, and exact description of the same, reference being had to the accompanying drawing, in which a bird's-eye view of the arrangement fully represents the construction.

In rubbing stone it is usually the practice to give a reciprocating motion to the rubber or polisher whether the work is done by machinery or by manual labor. This leaves the operation liable to many objections. The stone rubbed, is often unequally and in streaks abraded away and the polish (if the stone or marble is to be polished) necessarily put on a surface that is not a true plane.

My invention is intended to obviate this general tendency in machine or manual rubbing and polishing to leave the stone operated upon in the aforementioned unmerchantable condition.

The nature of my invention consists in so constructing a revolving frame of radial arms, braces and divisions suited to the reception of guide-boxes or carriages adapted to the rubbers or rubbing stone that the boxes running on slides and being charged with the rubber or other mass of stone and the aforementioned frame being hung over a suitable bed, by revolving the frame the guide-boxes or carriages are not only made to travel in a circle but by being geared to the bed by means of pinions with journals fixed to braces placed at suitable distances from the axis of motion and connected to the guide-boxes by cranks and rods, the aforesaid pinions meshing into a wheel firmly attached to the bed, the bed and the wheel not having rotary motion, and the cranks being started at any positions they may happen to occupy, the guide-boxes or carriages are made to deviate each one from the track of the preceding one and from its own track consecutively according to the number of teeth on the fixed wheel relatively to the number of teeth on the pinions or on each pinion if they (the pinions) are made of different proportions each to each, the revolutions during which each carriage would travel in some form of its own being at a greater or lesser number of revolutions, the maximum or minimum number being at the option of the machinist or operator and the stone being thus brought to a flat surface and freed from any danger of being streaked or irregularly or unevenly rubbed or polished, by being passed over by the rubber radially and circularly in a different track at every revolution with regard to one another and at any determinate number of revolutions with regard to themselves, the change in surfaces however from the effects of rubbing being such as to be adequate in practice to continuous self and relative deviation.

(A) is a bed, base, or floor, which is adapted to be elevated or depressed at will so as to admit blocks or slabs of stone between it and the rubber carriages (L) of any desired thickness. The floor supports the stones operated upon and is made strong and unyielding in any suitable way.

(B) is a toothed wheel firmly fixed in the bed A ( ) or otherwise and through which the shaft (C) of the frame (D) passes to rest on a pin inserted in a cross-tie below the bed or floor. The shaft rises up to a suitable distance and has a toothed wheel on its upper end which wheel is driven by any convenient power. The upper pin of the shaft may revolve in portable framing attached to the machine or making part of a shaft. The frame (D) consists of four arms (E) projecting as represented from the shaft (C). These arms have braces (F) between them, and, at a suitable distance from the extremities of these arms, ways (G) are made to project as represented for the purpose of supporting the rubber-carriages on tongue and grooves, V, or other slides. These ways (G) are firmly attached to the arms (E) by stout planking (H). Within the braces (F) stout planking or scantling is affixed to them and the arms (E) to which planking the journal boxes of the pinions (I) are fastened. On the upper end of the shaft of each of these pinions (I) cranks (K) are fixed and these cranks operate the rubber-carriages (L) by means of connecting rods (M). These rods pass through slots in the braces (F). The rubber-carriages (L) are oblong or other shaped frames, made of substantial planking or scantling, and to which frames are fitted rubbing stones that play vertically therein. On the ends of these carriages are slides that play in corresponding grooves in the ways G. These grooves and slides are made of steel or iron.

The number of teeth on the fixed wheel (B) is so arranged as not to be a multiple of the teeth of any one pinion whether the pinions are or are not relatively to each other of equal or unequal diameter. This arrangement causes the rubber-stones in any one revolution of the frame (D) to follow each other in different tracks.

It is obvious that the bed (A) can be paved with rubbing stones and the carriages constructed so as to hold the slabs or blocks of stone or marble to be rubbed or polished.

Having thus fully described the nature, operation and construction of my self-shifting, stone rubbing machine what I claim therein as new and desire to secure by Letters Patent is—

The combination of a fixed bed and toothed wheel with a rotating frame, constructed and arranged as herein described so that the pinions driving the rubber-carriages radially therein shall cause them to pass over a different track with regard to themselves and each other consecutively, the teeth on the fixed wheel not being a multiple of the teeth on any one of the pinions whether the pinions are of equal or unequal diameter the one to the other.

GEORGE FLETCHER, Sr.

Attest:
 HENRY H. TALBOTT,
 RICHARD C. TALBOTT.